United States Patent
An et al.

(10) Patent No.: US 11,979,050 B2
(45) Date of Patent: May 7, 2024

(54) BATTERY CHARGE/DISCHARGE CONTROL DEVICE AND BATTERY MANAGEMENT DEVICE

(71) Applicant: SK On Co., Ltd., Seoul (KR)

(72) Inventors: Sung Wook An, Daejeon (KR); Yong Uk Kim, Daejeon (KR)

(73) Assignee: SK On Co., Ltd., Seoul (KR)

( * ) Notice: Subject to any disclaimer, the term of this patent is extended or adjusted under 35 U.S.C. 154(b) by 421 days.

(21) Appl. No.: 17/314,147

(22) Filed: May 7, 2021

(65) Prior Publication Data

US 2021/0351605 A1    Nov. 11, 2021

(30) Foreign Application Priority Data

May 11, 2020    (KR) .................. 10-2020-0055641

(51) Int. Cl.
*H02J 7/00*    (2006.01)

(52) U.S. Cl.
CPC ........ *H02J 7/00714* (2020.01); *H02J 7/0068* (2013.01)

(58) Field of Classification Search
CPC ............................ H02J 7/00714; H02J 7/0068
USPC ...................................................... 320/137
See application file for complete search history.

(56) References Cited

U.S. PATENT DOCUMENTS

| | | | |
|---|---|---|---|
| 9,917,451 B2* | 3/2018 | Kim ..................... | H02J 7/0031 |
| 2001/0007417 A1* | 7/2001 | Kitagawa ................. | H02J 7/34 |
| | | | 320/128 |
| 2002/0057073 A1* | 5/2002 | Kitagawa ................. | H02J 7/34 |
| | | | 320/135 |
| 2005/0105308 A1* | 5/2005 | Urakabe ............... | H02M 7/219 |
| | | | 363/65 |
| 2012/0019061 A1* | 1/2012 | Nishihara ........... | H01M 10/482 |
| | | | 429/7 |
| 2012/0105015 A1* | 5/2012 | Hermann .............. | H02J 7/0031 |
| | | | 320/164 |
| 2013/0241480 A1* | 9/2013 | Kirimoto .............. | H02J 7/0013 |
| | | | 320/109 |
| 2017/0257039 A1* | 9/2017 | Namou ............. | H02M 7/53875 |
| 2021/0351605 A1* | 11/2021 | An ........................ | H02J 7/0031 |
| 2022/0115878 A1* | 4/2022 | Khozikov ............... | B60L 58/18 |

FOREIGN PATENT DOCUMENTS

| | | |
|---|---|---|
| KR | 1020150106695 A | 3/2014 |
| KR | 1020130031322 A | 12/2014 |
| KR | 1020160055751 A | 11/2020 |

* cited by examiner

*Primary Examiner* — Mohammed Alam
(74) *Attorney, Agent, or Firm* — The Webb Law Firm (57) ABSTRACT

The present invention provides a battery charge/discharge control device including a contactor driver which is on/off controlled according to AN output signal of a micro control unit (MCU), a contactor coil through which current flows according to an on/off state of the contactor driver, and whose one end is electrically connected to the contactor driver and the other end is electrically connected to a power source, and a contactor which is turned on by the current flowing through the contactor coil so as to perform charging and discharging of the battery.

11 Claims, 11 Drawing Sheets

BATTERY CHARGE/DISCHARGE CONTROL DEVICE AND BATTERY MANAGEMENT DEVICE

CROSS-REFERENCE TO RELATED APPLICATION

This application claims priority to Korean Patent Application No. 10-2020-0055641 filed May 11, 2020, the disclosure of which is hereby incorporated by reference in its entirety.

BACKGROUND OF THE INVENTION

1. Field of the Invention

The present invention relates to a battery charge/discharge control device which stably controls charging and discharging of a power in a battery even if an abnormality occurs in a battery management device, and the battery management device.

2. Description of the Related Art

Recently, research and development on a secondary battery have been actively made. Herein, the secondary battery is a rechargeable battery, and includes all of a conventional Ni/Cd battery, a Ni/MH battery, etc., and a recent lithium ion battery. Among the secondary batteries, a lithium ion battery has an advantage of having a much higher energy density than the conventional Ni/Cd battery and Ni/MH battery, etc. In addition, the lithium ion battery can be manufactured in small size and light weight, thereby being used as a power source for mobile devices. Further, the lithium ion battery has been in the spotlight as a next-generation energy storage medium due to the expanded range of use as a power source for electric vehicles.

The secondary battery is generally used as a battery pack including a battery module in which a plurality of battery cells are connected in series and/or in parallel. In addition, the state and operation of the battery pack are managed and controlled by a battery management system.

Then, a plurality of battery modules are connected in series/parallel to form a battery rack, and a plurality of battery racks are connected in parallel to form a battery bank. This battery bank may be used as an energy storage system (ESS). Each of the battery modules is monitored and controlled by a corresponding module battery management system (BMS). A rack BMS, which is a top-level controller in each battery rack, monitors and controls each module BMS, and monitors and controls the states of the entire battery rack based on information obtained from the module BMSs.

A micro control unit (MCU) of the BMS determines charging/discharging states of the battery module or battery pack, outputs a switch-on signal for charging or discharging the battery, and outputs a switch-off signal to stop charging or discharging the battery if it is determined that the battery is in an over-charged or over-discharged state.

When a switch connected for charging and discharging the battery is a contactor, and if the MCU outputs an on signal, the contactor is turned on to charge the battery. However, even in a case of a failure of the MCU itself, the on signal may be output. At this time, the contactor is also turned on to charge the battery, thereby resulting in a problem that the battery is overcharged.

That is, there is a problem that the contactor is always turned on due to a malfunction of the MCU, such that a situation in which the battery is overcharged or overdischarged occurs, and there is a risk that it will not be transitioned to a safe state.

SUMMARY OF THE INVENTION

In consideration of the above-mentioned circumstances, it is an object of the present invention to provide a battery charge/discharge control device and a battery management device, which may prevent overcharging or overdischarging of a battery by controlling a switch on/off without a separate watchdog, even if a failure occurs in an MCU.

To achieve the above-described object, according to an aspect of the present invention, there is provided a battery charge/discharge control device, including: a contactor driver which is on/off controlled according to an output signal of a micro control unit (MCU); a contactor coil through which current flows according to an on/off state of the contactor driver, and whose one end is electrically connected to the contactor driver and the other end is electrically connected to a power source; and a contactor which is turned on by the current flowing through the contactor coil so as to perform charging and discharging of the battery.

According to an embodiment of the present invention, the battery charge/discharge control device may further include a monostable vibrator which is located between the MCU and the contactor driver, and is configured to output an on signal to the contactor driver when an output signal of the MCU is a signal, which is a pulse width modulation (PWM) signal, and output an on signal to the contactor driver when the output signal of the MCU is an on signal or an off signal, wherein the monostable vibrator is turned on by receiving an enable signal from the MCU.

In the battery charge/discharge control device according to an embodiment of the present invention, the contactor driver may be any one of FET and gate drivers.

In the battery charge/discharge control device according to an embodiment of the present invention, the current may flow through the contactor coil when the contactor driver is turned on, and the current may not flow therethrough when the contactor driver is turned off.

In the battery charge/discharge control device according to an embodiment of the present invention, the contactor may be turned on when the current flows through the contactor coil, and may be turned off when the current does not flow through the contactor coil.

According to another aspect of the present invention, there is provided a battery management device, including: a micro control unit (MCU) configured to control a switching unit by receiving a measured current and voltage of a battery to determine whether to charge or discharge the battery; and a switch control unit configured to control charging or discharging of the battery by turning on/off a switch according to a signal received from the MCU.

In the battery management device according to an embodiment of the present invention, the switch control unit may include: a contactor driver which is on/off controlled according to an output signal of the MCU; and a contactor coil through which current flows according to an on/off state of the contactor driver, and whose one end is electrically connected to the contactor driver and the other end is electrically connected to a power source.

In the battery management device according to an embodiment of the present invention, the switch control unit may further include:

a monostable vibrator which is located between the MCU and the contactor driver, and is configured to output an on signal to the contactor driver when an output signal of the MCU is a signal, which is a pulse width modulation (PWM) signal, and output an on signal to the contactor driver when the output signal of the MCU is an on signal or an off signal.

In the battery management device according to an embodiment of the present invention, the contactor driver may be any one of FET and gate drivers.

In the battery management device according to an embodiment of the present invention, the current may flow through the contactor coil when the contactor driver is turned on, and the current may not flow therethrough when the contactor driver is turned off.

In the battery management device according to an embodiment of the present invention, the contactor may be turned on when the current flows through the contactor coil, and may be turned off when the current does not flow through the contactor coil.

In the battery management device according to an embodiment of the present invention, the switch may be a contactor.

According to the embodiments of the present invention, when an on signal is output due to a failure occurred in a contactor control pin of the MCU (stuck at high or short to VDD), or when a malfunction of the MCU itself occurs, the contactor can be stably opened or turned on, such that overdischarging or overcharging of the battery may be prevented.

According to embodiments of the present invention, even when a malfunction of the MCU occurs, using characteristics of the monostable vibrator, a vehicle or the like can be stably operated by maintaining the contactor in an on or off state for a specific time.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE INVENTION

Hereinafter, specific embodiments of the present invention will be described with reference to the accompanying drawings. The following detailed description is provided to contribute to a comprehensive understanding of a method, apparatus, and/or system described herein. However, these embodiments merely illustrative examples, and the present invention is not limited thereto.

In descriptions of the embodiments of the present invention, publicly known techniques that are judged to be able to make the purport of the present invention unnecessarily obscure will not be described in detail. Referring to the drawings, wherein like reference characters designate like or corresponding parts throughout the several views. In addition, the terms as used herein are defined by taking functions of the present disclosure into account and can be changed according to the custom or intention of users or operators. Therefore, definition of the terms should be made according to the overall disclosure set forth herein. In addition, the terminology used herein is for the purpose of describing particular embodiments only and is not intended to limit the present invention thereto. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
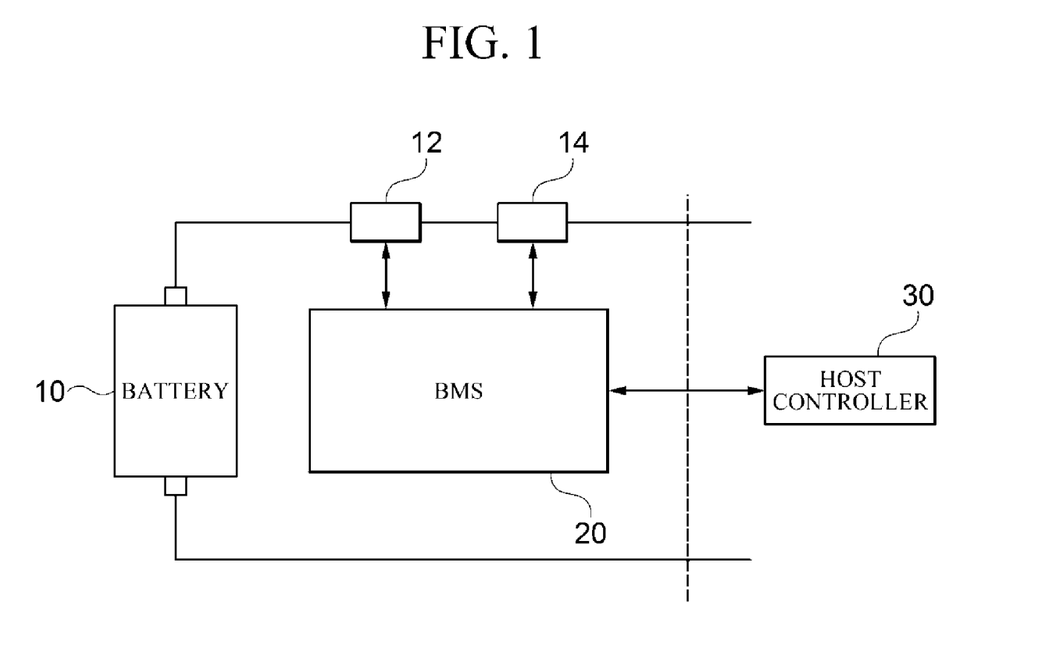
FIG. 1 is a view schematically illustrating an arrangement and a configuration of a battery management device according to an embodiment of the present invention.

FIG. 1 is a view schematically illustrating an arrangement and a configuration of a battery management device according to an embodiment of the present invention.

A battery module 10 (or a battery pack) may include one or more battery cells (or battery modules).

The battery management device includes: a rechargeable battery module 10; a sensor 12 connected in series to a positive (+) or negative (−) terminal side of the battery module 10 to measure current, voltage or temperature of the battery module 10; a switching unit 14 for controlling flow of charge/discharge current of the battery module 10; and a battery management system (BMS) 20 for controlling and managing the voltage, current, temperature, etc. of the battery module 10 to prevent overcharging and overdischarging thereof.

Herein, the switching unit 14 is an element for controlling current flow for charging or discharging of the battery module 10, and, for example, at least one contactor may be used.

In addition, the BMS 20 can measure or calculate voltages and currents of a gate, source, and drain of a semiconductor switching element in order to monitor the voltage, current, and temperature of the battery module 10, and may also measure the current, voltage, and temperature of the battery module by using the sensor 12 provided adjacent to the switching element. The BMS 20 is an interface that receives values obtained by measuring the above-described various parameters, and may include a plurality of terminals and a circuit connected to these terminals to process values input thereto.

In addition, the BMS 20 may perform on/off control of the switching unit 14, and may be connected to the battery module 10 to monitor states of the battery module 10.

The configuration of the battery module 10 and the BMS 20 are known configurations, and therefore will not be described in detail.

Meanwhile, the BMS 20 according to the embodiments of the present invention is connected to a host controller 30, and an operation thereof may be controlled based on a signal applied from the host controller 30.

Hereinafter, an operation for performing on/off control of the switching unit 14 by the BMS 20 in order to control charging/discharging of the battery will be described in more detail.

Figure 2:
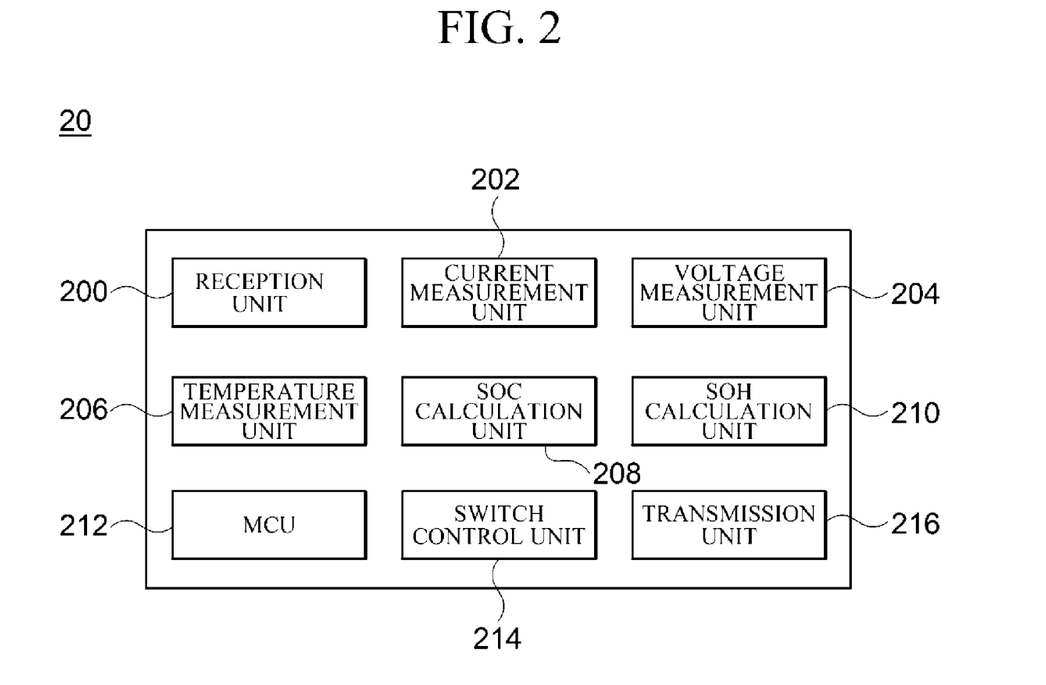
FIG. 2 is a block diagram schematically illustrating a configuration of a battery management system according to an embodiment of the present invention.

FIG. 2 is a block diagram schematically illustrating a configuration of a battery management system according to an embodiment of the present invention.

The BMS 20 includes a reception unit 200, a current measurement unit 202, a voltage measurement unit 204, a temperature measurement unit 206, a state of charge (SOC) calculation unit 208, a state of health (SOH) calculation unit 210, a control unit 212 (MCU), a switch control unit 214, and a transmission unit 216.

The reception unit 200 receives a battery status check command or a battery control command from the host controller 30.

The current measurement unit 202 measures the current of the battery module. In general, measurement of the battery current may be performed using a current sensor corresponding to at least one of a current transformer method, a hall element method, and a fuse method.

The voltage measurement unit 204 measures voltages at both ends of the battery module. In general, there are methods for measuring the battery voltage, for example, a method using an operational amplifier (op amp) and a method using a relay and a capacitor.

The temperature measurement unit 206 measures the temperature of the battery module. In general, the battery temperature measurement unit may be, for example, a thermistor. The thermistor is a semiconductor element prepared by mixing and sintering oxides such as manganese, nickel, copper, cobalt, chromium, and iron, etc., and is an element having a characteristic in which an electrical resistance value is changed depending on the temperature. For example, the thermistor may be a positive temperature coefficient (PTC) thermistor in which the temperature and resistance values are proportional, a negative temperature coefficient (NTC) thermistor in which the temperature and resistance values are inversely proportional, and a critical temperature resistor (CIR) in which the temperature and resistance values are rapidly changed at a specific temperature.

The SOC calculation unit 208 receives the voltage value of the battery module measured from the voltage measurement unit 204. The SOC calculation unit 208 receives the current value of the battery module measured from the current measurement unit 202. The SOC calculation unit 208 receives the temperature value of the battery module measured from the temperature measurement unit 206.

The SOC calculation unit 208 calculates the SOC of the battery module by using at least one of the voltage, current, and temperature of the battery module. In general, the battery SOC is represented by a percentage of a full charge capacity of the battery. As a method of estimating an SOC, there are a current integration method, a method using an extended Kalman filter, an electric circuit model method, an electrochemical model method, a data-based method and the like. The SOC calculation unit 208 calculates SOCs for each of a plurality of battery modules. That is, the SOC calculation unit 208 calculates the SOCs of the battery module using at least one of the measured voltage, current, and temperature of the battery module to which a plurality of battery cells are connected in parallel.

The SOH calculation unit 210 receives the voltage value of the battery module measured from the voltage measurement unit 204. The SOH calculation unit 210 receives the current value of the battery module measured from the current measurement unit 204. The SOH calculation unit 210 receives the temperature value measured from the temperature measurement unit 206. The SOH calculation unit 210 receives the SOC value of the battery module calculated from the SOC calculation unit 208. In addition, the SOH calculation unit 210 also calculates SOHs for each of the plurality of battery modules using the voltage values, current values, temperature values, and SOC values for each of the plurality of battery modules.

SOH represents a degree of deterioration of battery capacity due to aging. SOH may be used to adjust the charging/discharging capacity according to a replacement time of the battery and a usage period of the battery.

As a method of estimating an SOH, there are a method of integrating battery charge/discharge current and a method of estimating using the estimated SOC. In the present invention, a method of estimating an SOH using the estimated SOC is used. A specific method thereof is a known technique, and therefore will not be described in detail.

The control unit 212 (MCU) receives the calculated SOC and SOH of the battery module 10 from the SOC calculation unit 208 and the SOH calculation unit 210. The control unit 212 determines charging/discharging of the battery or determines abnormality of the battery based on the received SOC and SOH of the battery module 10.

When charging or discharging of the battery is required, the control unit 212 controls the switch control unit 214 to perform charging or discharging of the battery module 10 by the switching unit 14. Generally, the control unit 212 outputs a switch-on signal to the switch control unit 214 in order to control the switch control unit 214 to turn on the switching unit 14. The control unit 212 outputs, for example, a pulse width modulation (PWM) signal to the switch control unit 214. In order to prevent overcharging or overdischarging of the battery module 10 during charging or discharging the battery module 10, the control unit 212 outputs a low signal (LOW) or high signal (HIGH) to the switch control unit 214 in order to stop charging or discharging after performing the charging or discharging for a certain period of time.

When receiving the PWM signal from the control unit 212, the switch control unit 214 generates a signal to turn on the switching unit 14. When receiving a low signal or a high signal from the control unit 212, the switch control unit 214 generates a signal for turning off the switching unit 14. Specifically, the switch control unit 214 includes a monostable vibrator 302, a contactor driver 304, and a contactor coil 306. The switch control unit 214 may further include a digital isolator 503. One end of the monostable vibrator 302 is connected to the control unit 212 and the other end is connected to the contactor driver 304. In detail, one end of the monostable vibrator 302 may be connected to the MCU 300 of the control unit 212. In addition, one end of the contactor driver 304 is connected to the monostable vibrator 302, and the other end is connected to the contactor coil 306. One end of the contactor coil 306 is connected to the contactor driver 304, and the other end is connected to a power source.

When receiving an enable signal and the PWM signal from the MCU 300 of the control unit 212, the monostable vibrator 302 outputs a high signal (HIGH) to the contactor driver 304. The monostable vibrator 302 is an element that maintains the output in a high or low state when a specific pulse is continuously supplied within a certain period of time. When receiving the enable signal and the low/high signal from the MCU 300 of the control unit 212, the monostable vibrator 302 outputs a low signal LOW to the contactor driver 304.

The contactor driver 304 that has received the high signal from the monostable vibrator 302 is transitioned to an on state. The contactor driver 304 is, for example, a FET or gate driver. When the contactor driver 304 is turned on, current flows through the contactor coil 306 between the power source and the contactor driver 304. Then, the contactor 308 is turned on by an induced current generated as the current flows through the contactor coil. When the contactor 308 is turned on, the battery is charged or discharged.

On the other hand, the contactor driver 304 that has received the low signal from the monostable vibrator 302 is transitioned to an off state. When the contactor driver 304 is transitioned to the off state, the current does not flow through the contactor coil 306 connected to the contactor driver 304, and the contactor 308 is also turned off. Thereby, charging or discharging of the battery is stopped.

The transmission unit 216 transmits the voltage, current, temperature, SOC and SOH values of the battery cell/module to the host controller 30. The transmission unit 216 communicates with the host controller 30 in a wired or wireless manner. When the transmission unit 216 wirelessly communicates with the host controller 30, they may communicate with each other through TCP/IP. In addition, when it is determined that there is an abnormality in the BMS 20 such as an abnormality of the battery cell/module or a hardware abnormality of the BMS 20 using battery information and battery status information (e.g., the voltage, current, temperature, SOC or SOH value, etc. of the battery cell/module), the transmission unit 216 transmits abnormal data of the battery cell/module and abnormal data of the BMS 20 to the host controller 30.

Figure 3A:
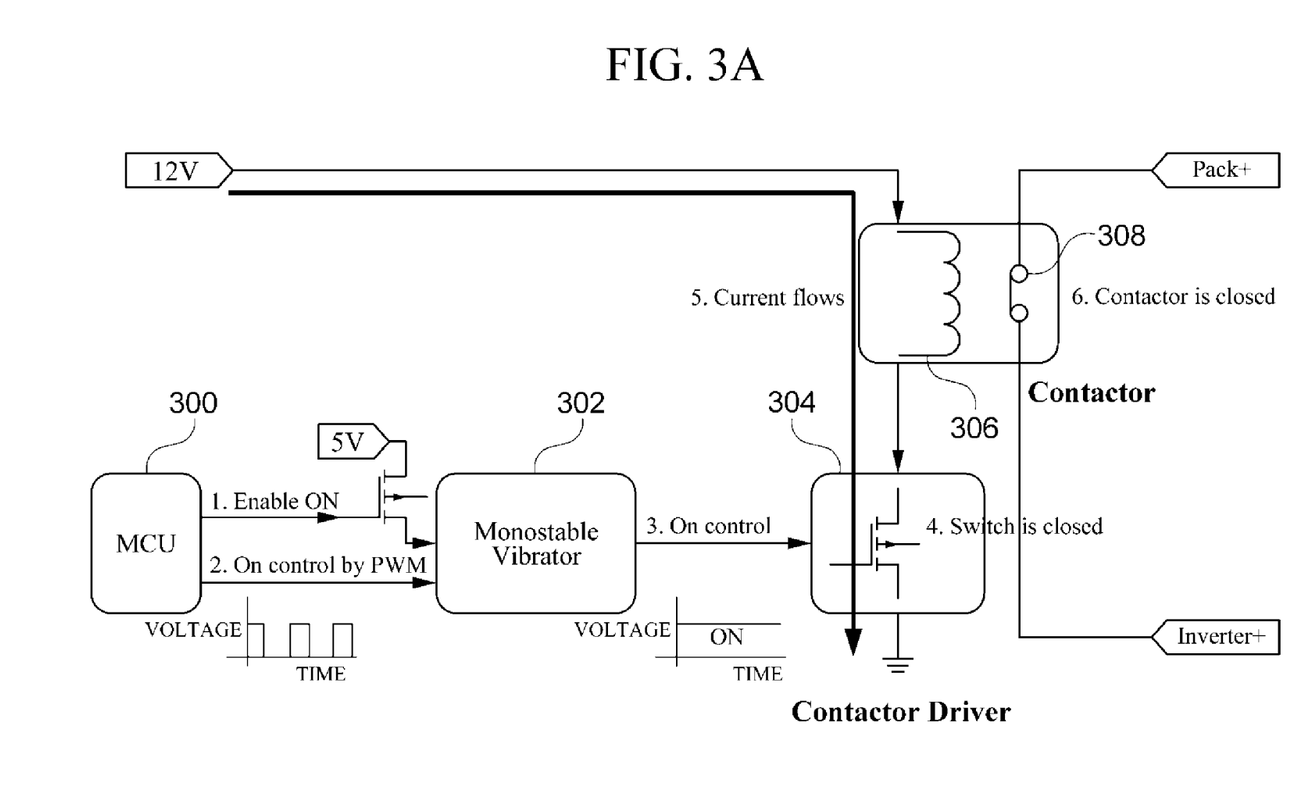
FIGS. 3A to 3C are views schematically illustrating configurations and operations of a battery charge/discharge control device according to an embodiment of the present invention.
Figure 3B:
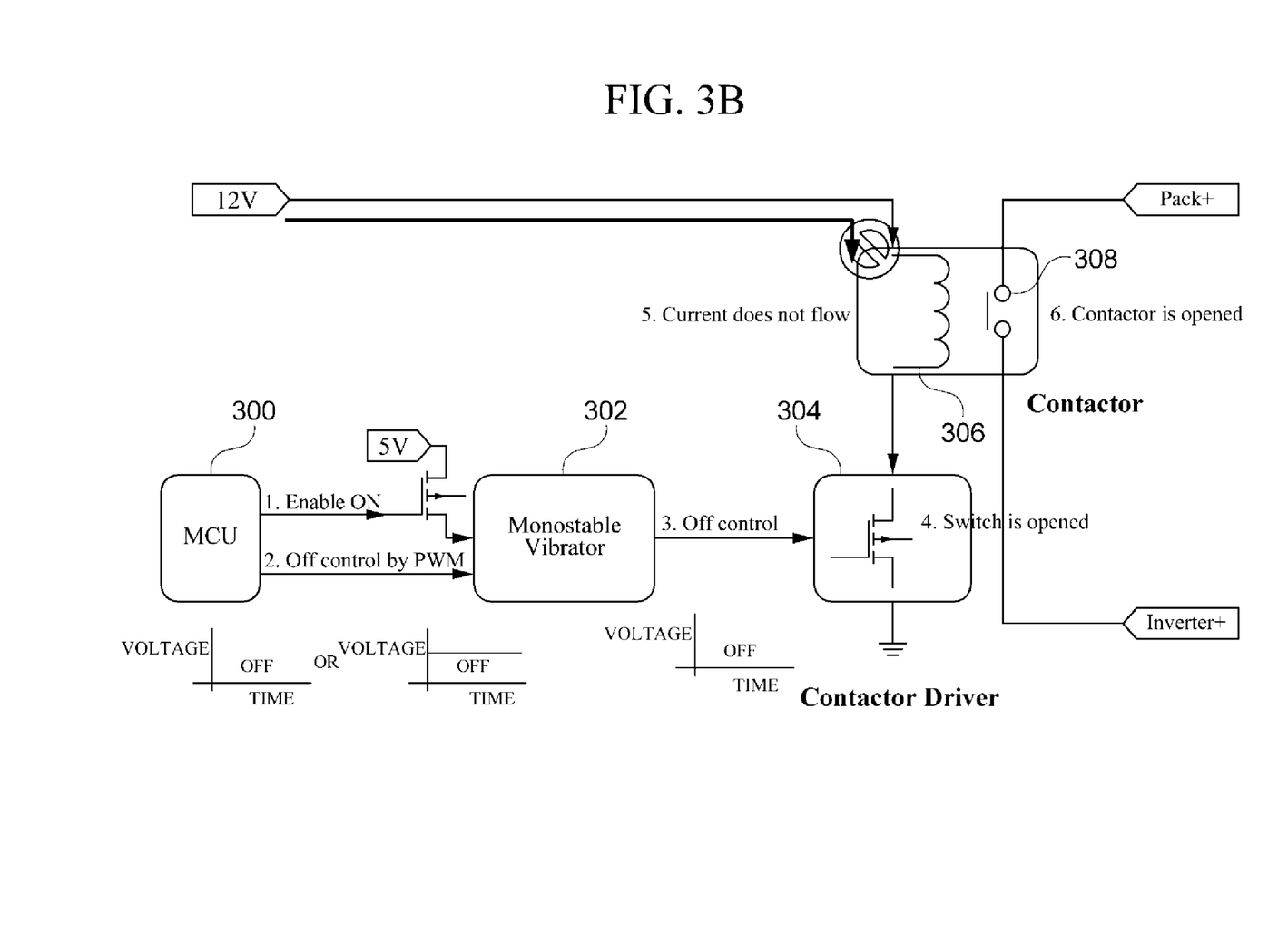
Figure 3C:
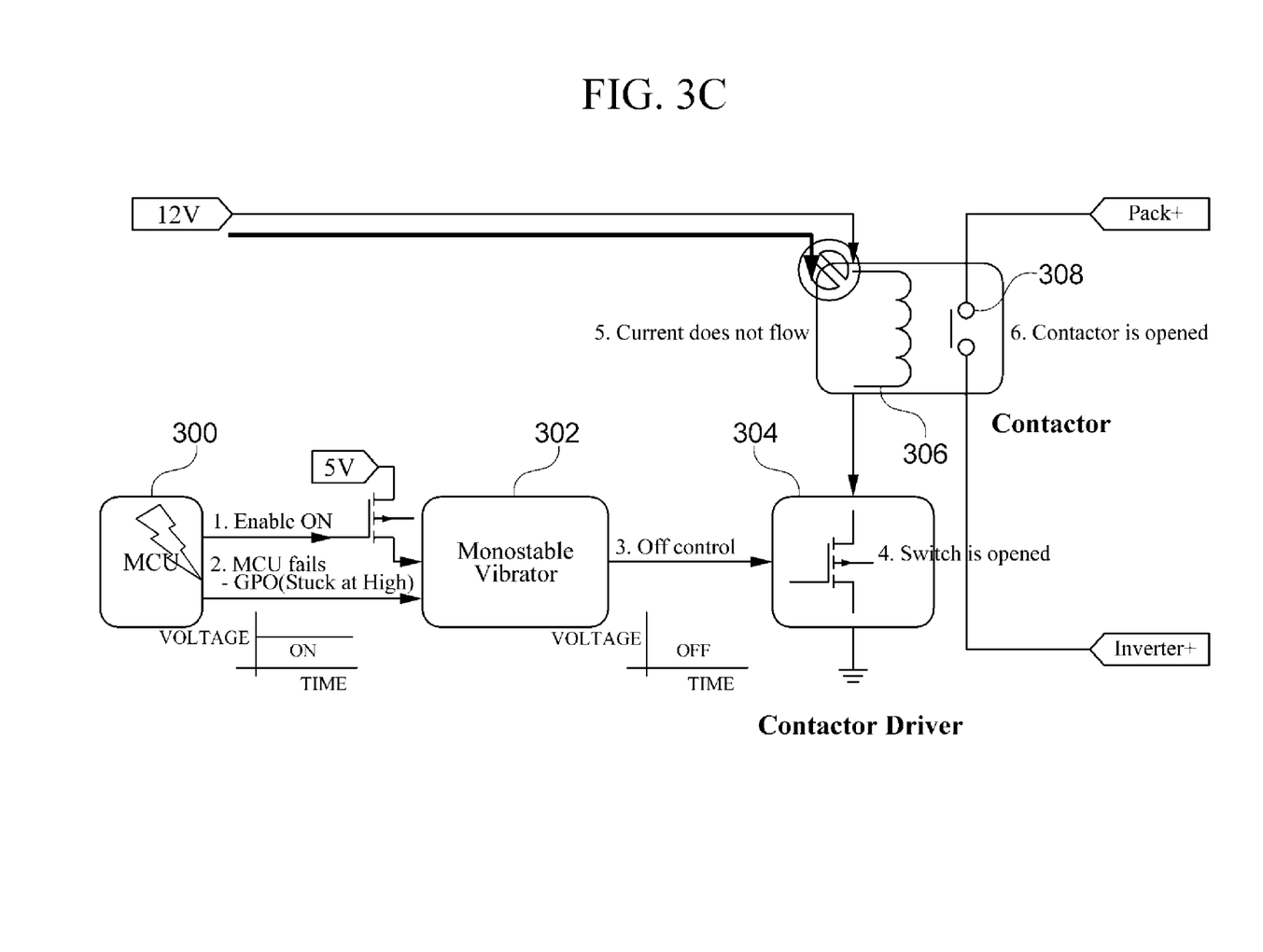

FIGS. 3A to 3C are views schematically illustrating configurations and operations of a battery charge/discharge control device according to an embodiment of the present invention.

Figure 4A:
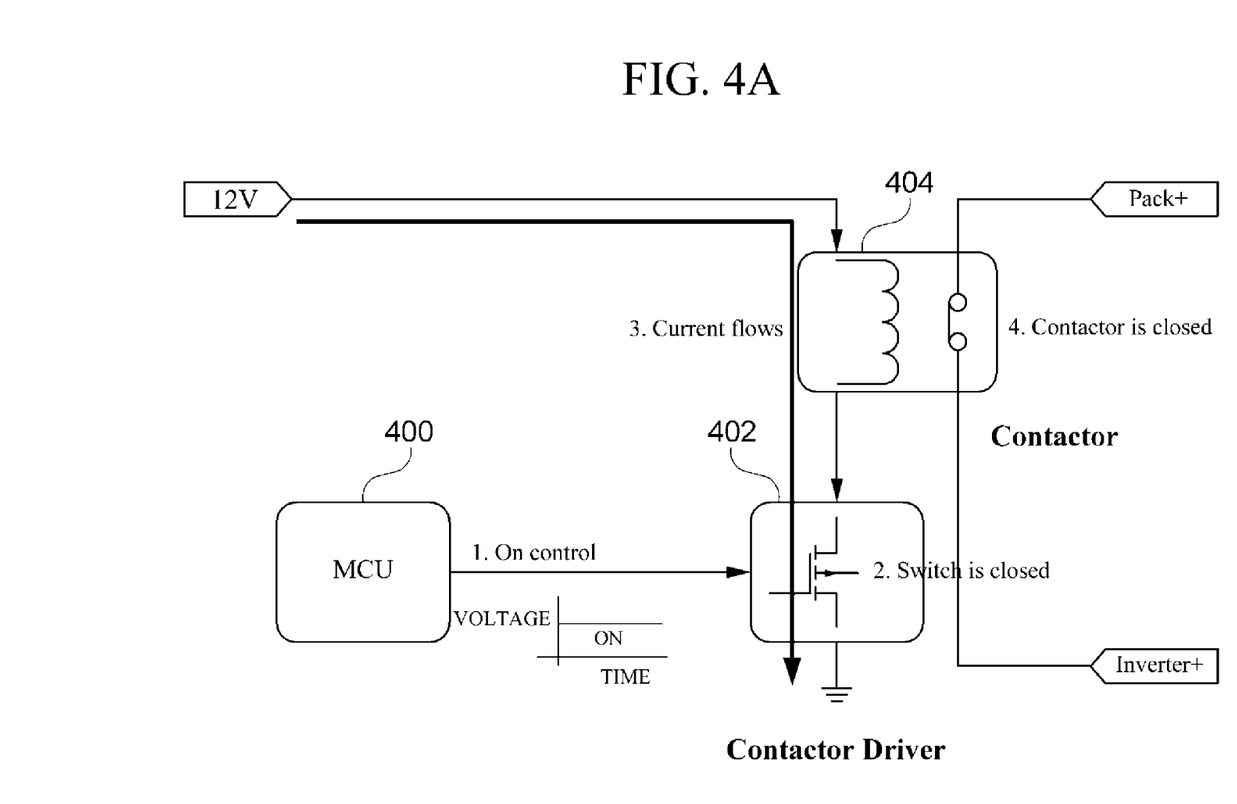
FIGS. 4A to 4C are views schematically illustrating a configuration of a conventional battery management device.

In this regard, a conventional battery charge/discharge control device will be described with reference to FIGS. 4A to 4C. As shown in FIG. 4A, an MCU 400 outputs a high signal to control the contactor to be turned on for charging or discharging the battery. The contactor driver receiving the high signal output from the MCU 400 is turned on, and thereby, a current flows through the contactor coil disposed between the contactor driver and the power source. When current flows through the contactor coil, the contactor is turned on. When the contactor is turned on, the battery is charged or discharged.

Figure 4B:
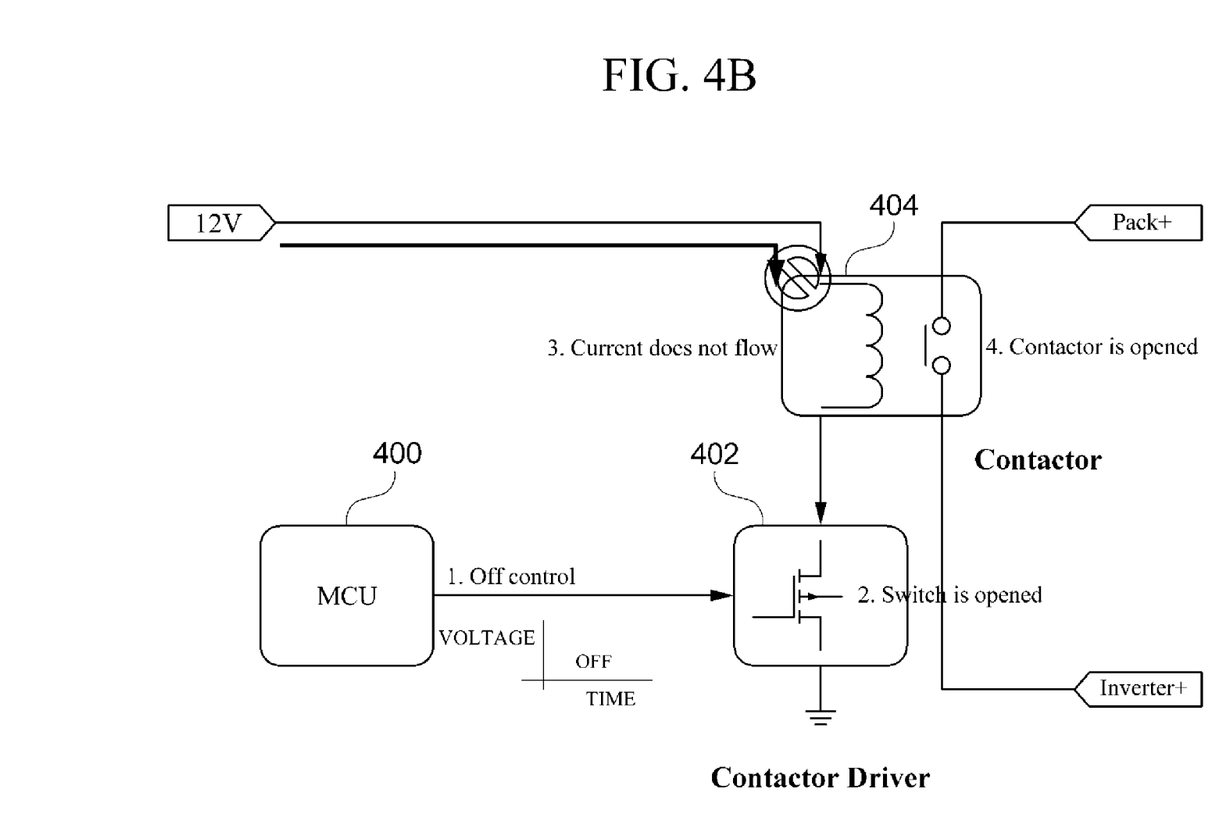

Meanwhile, conventionally, as shown in FIG. 4B, the MCU 400 outputs a low signal to control the contactor to an off state in order to stop charging or discharging the battery. The contactor driver receiving the low signal output from the MCU 400 is turned off, and thereby, no current is generated in the contactor coil disposed between the contactor driver and the power source, and the contactor is turned off. When the contactor is turned off, the battery is not charged or discharged.

Figure 4C:
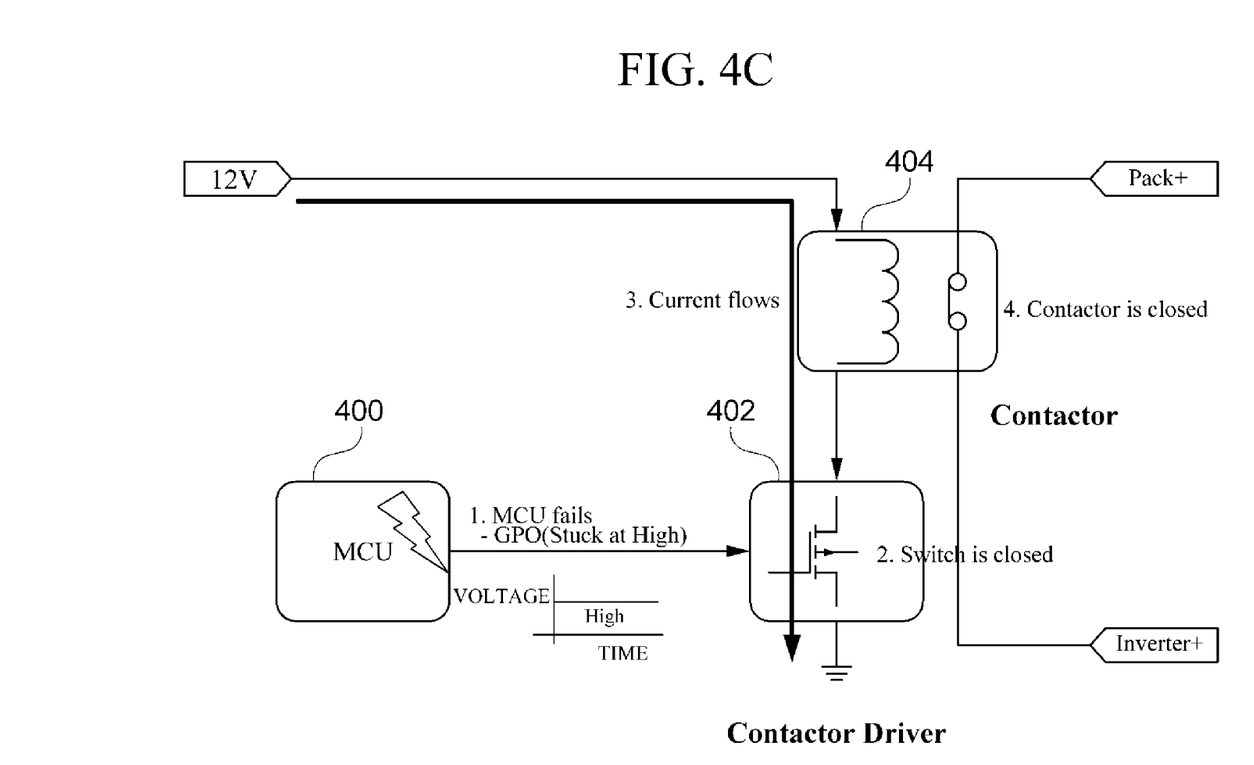

However, as in the prior art, if the low or high signal of the MCU is immediately output to the contactor driver, as shown in FIG. 4C, when a high signal is output (Stuck at high), there is a problem that the battery is overcharged or overdischarged while the contactor is turned on due to a malfunction of the MCU 400.

To solve the above problem, the present invention further includes the monostable vibrator 302. Specifically, when it is determined that charging or discharging of the battery is required by the MCU 300, as shown in FIG. 3A, a PWM signal is output to the monostable vibrator 302. The monostable vibrator 302 maintains the output at a high or low level if a specific pulse is continuously supplied within a specific time.

The monostable vibrator 302 that has received the PWM signal from the MCU 300 outputs an on signal to the contactor driver. The contactor driver 304 that has received the on signal is turned on, and the current flows through the contactor coil 306. When an induced current flows through the contactor coil 306, the contactor 308 is turned on accordingly.

When the contactor 308 is turned on, the battery is charged or discharged.

Referring to FIG. 3B, according to an embodiment of the present invention, the MCU 300 determines a charging or discharging state of the battery based on the SOC of the battery, and outputs a signal for stopping the charging or discharging of the battery in order to prevent overcharging/overdischarging thereof. The MCU 300 outputs a high or low signal as a signal to stop charging or discharging the battery. The monostable vibrator 302 that has received a high or low signal from the MCU 300 transmits the low signal to the contactor driver 304 (a state in which power is not input to the contactor driver 304). When the contactor driver 304 is turned off, current does not flow through the contactor coil 306 and the contactor 308 is turned off. By turning off the contactor 308, charging or discharging of the battery is stopped, and thereby preventing the battery from overcharging or overdischarging.

Referring to FIG. 3C, in an embodiment of the present invention, even if the charging/discharging of the battery needs to be stopped due to a failure of the MCU 300 and continuously outputs the high signal, the monostable vibrator 302 does not receive the PWM signal, thus to transmit a low signal to the contactor driver. That is, the monostable vibrator 302 prevents the current from flowing even if the MCU 300 fails and the high signal is output, such that the contactor driver 304 is turned off. Accordingly, even if the MCU 300 fails, the contactor 308 is stably turned off to stop charging or discharging the battery to prevent overdischarging or overcharging thereof.

By changing external R and C values of the monostable vibrator, it is possible to add a retaining function that can maintain the contactor for a certain time or more, even if the MCU fails.

Figure 5A:
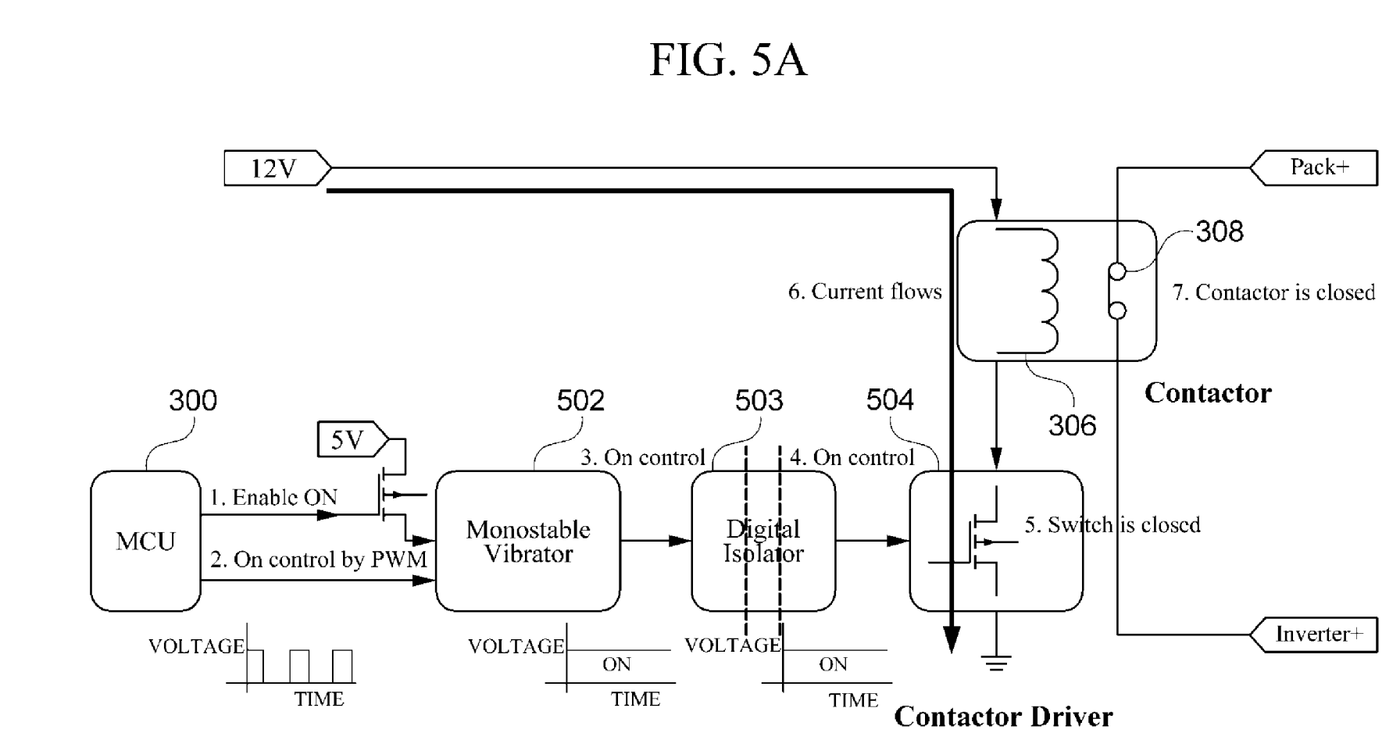
FIGS. 5A to 5C are views schematically illustrating configurations and operations of a battery charge/discharge control device according to another embodiment of the present invention.
Figure 5B:
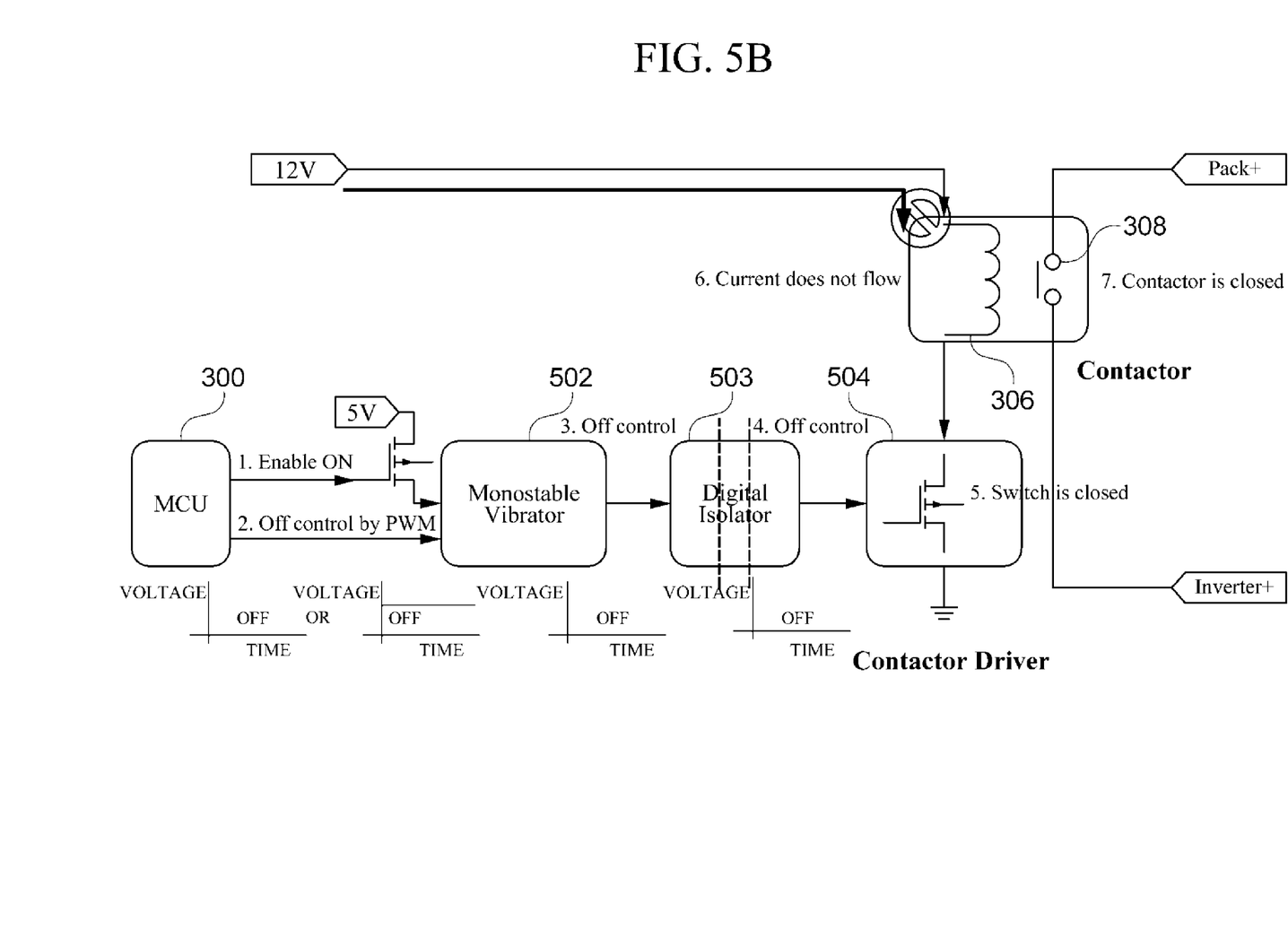
Figure 5C:
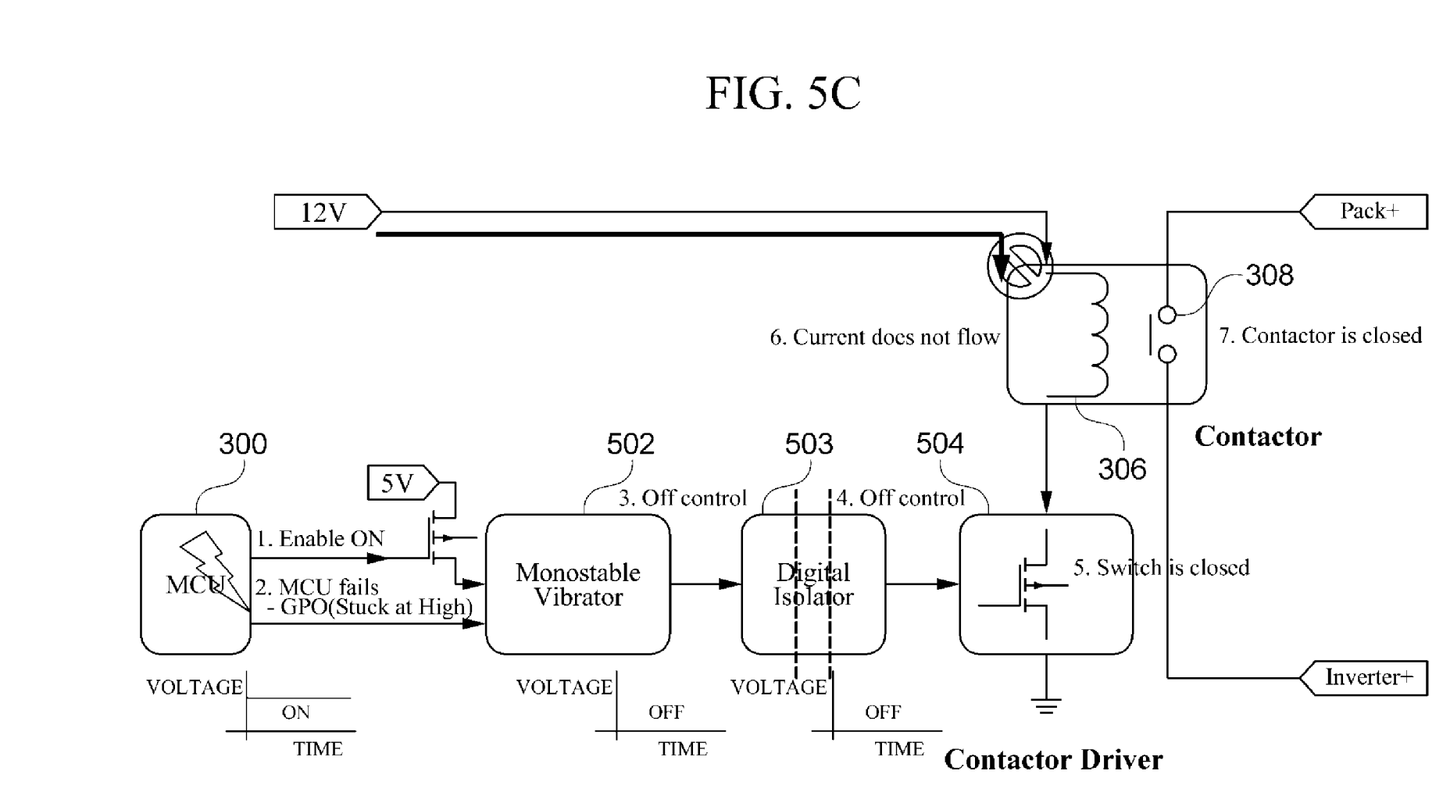

FIGS. 5A to 5C are views schematically illustrating configurations and operations of a battery charge/discharge control device according to another embodiment of the present invention.

Most configurations of the embodiment shown in FIGS. 5A to 5C are the same as those of the embodiment of the present invention shown in FIGS. 3A to 3C, except for further including a digital isolator 503 between a monostable vibrator 502 and a contactor driver 504.

The digital isolator 503 serves as a buffer between an output of the monostable vibrator 502 and a signal input to the contactor driver 504 and provides electrical separation from each other, thereby preventing various collisions due to surge, noise, and grounding problems, as well as power problems.

In the present specification, 'an embodiment' of the principles of the present invention and designation of various modifications of the expression denote that a specific feature, structure, and characteristic are included in at least one embodiment of the principle of the present invention. Therefore, the expression 'in an embodiment' and arbitrary other modification examples disclosed herein do not necessarily refer to the same embodiment.

All embodiments and conditional embodiments disclosed through the present specification are described with an intention to help the persons who have a common knowledge in the technical field to which the invention pertains to understand the principles and concepts of the present invention, and it will be understood by those skilled in the art that the present invention may be implemented in a modified form without departing from the essential characteristics of the present invention. Therefore, the embodiments described in this disclosure should not be construed to limit the technical spirit of the present invention, but should be construed to illustrate the technical spirit of the present invention. The scope of the present invention should be interpreted according to the following appended claims not the above description, and the present invention should be construed to cover all modifications or variations induced from the meaning and scope of the appended claims and their equivalents.

DESCRIPTION OF REFERENCE NUMERALS

20: BMS
200: Reception unit
202: Current measurement unit
204: Voltage measurement unit
206: Temperature measurement unit
208: SOC calculation unit
210: SOH calculation unit
212: MCU
214: Switch control unit
216: Transmission unit

What is claimed is:

1. A battery charge/discharge control device comprising:
a contactor driver which is on/off controlled according to an output signal of a micro control unit (MCU);
a contactor coil coupled to the contactor driver and through which current flows according to an on/off state of the contactor driver, wherein one end of the contactor coil is electrically connected to the contactor driver and another end of the contactor coil is electrically connected to a power source;
a contactor which is turned on by the current flowing through the contactor coil so as to perform charging and discharging of the battery via the contactor; and
a monostable vibrator which is located between the and the contactor driver, and is configured to output an on signal to the contactor driver when an output signal of the MCU is a signal, which is a pulse width modulation (PWM) signal, and output an off signal to the contactor driver when the output signal of the MCU is an on signal or an off signal.

2. The battery charge/discharge control device according to claim 1, wherein the monostable vibrator is turned on by receiving an enable signal from the MCU.

3. The battery charge/discharge control device according to claim 2, wherein the contactor driver is any one of FET and gate drivers.

4. The battery charge/discharge control device according to claim 2, wherein current flows through the contactor coil when the contactor driver is turned on, and the current does not flow therethrough when the contactor driver is turned off.

5. The battery charge/discharge control device according to claim 4, wherein the contactor is turned on when the current flows through the contactor coil, and is turned off when the current does not flow through the contactor coil.

6. The battery charge/discharge control device according to claim 5, further comprising a digital isolator between the monostable vibrator and the contactor driver.

7. A battery management device comprising:
a micro control unit (MCU) configured to control a switching unit by receiving a measured current and voltage of a battery to determine whether to charge or discharge the battery; and
a switch control unit configured to control charging or discharging of the battery by turning on/off a switch according to a signal received from the MCU,
wherein the switch control unit comprises:
a contactor driver which is on/off controlled according to an output signal of the MCU;
a contactor coil coupled to the contactor driver and through which current flows according to an on/off state of the contactor driver, wherein one end of the contactor coil is electrically connected to the contactor driver and another end of the contactor coil is electrically connected to a power source; and
a monostable vibrator which is located between the MCU and the contactor driver, and is configured to output an on signal to the contactor driver when an output signal of the MCU is a signal, which is a pulse width modulation (PWM) signal, and output an off signal to the contactor driver when the output signal of the MCU is an on signal or an off signal.

8. The battery management device according to claim 7, wherein the contactor driver is any one of FET and gate drivers.

9. The battery management device according to claim 7, wherein current flows through the contactor coil when the contactor driver is turned on, and the current does not flow therethrough when the contactor driver is turned off.

10. The battery management device according to claim 9, wherein the contactor is turned on when the current flows through the contactor coil, and is turned off when the current does not flow through the contactor coil.

11. The battery management device according to claim 7, wherein the switch is a contactor.

* * * * *

UNITED STATES PATENT AND TRADEMARK OFFICE
CERTIFICATE OF CORRECTION

| | | |
|---|---|---|
| PATENT NO. | : 11,979,050 B2 | Page 1 of 1 |
| APPLICATION NO. | : 17/314147 | |
| DATED | : May 7, 2024 | |
| INVENTOR(S) | : Sung Wook An et al. | |

It is certified that error appears in the above-identified patent and that said Letters Patent is hereby corrected as shown below:

In the Claims

Column 9, Line 47, Claim 1, delete "the" and insert -- the MCU --

Signed and Sealed this
Twenty-fifth Day of June, 2024

*Katherine Kelly Vidal*

Katherine Kelly Vidal
*Director of the United States Patent and Trademark Office*